UNITED STATES PATENT OFFICE.

MARIE MÉLINA LAMONTAGNE, OF MONTREAL, QUEBEC, CANADA.

EYE-WATER.

SPECIFICATION forming part of Letters Patent No. 312,131, dated February 10, 1885.

Application filed August 16, 1884. (No specimens.)

*To all whom it may concern:*

Be it known that I, MARIE MÉLINA LAMONTAGNE, wife of Charles Edouard Brien dit Desrochers, residing in the city of Montreal, in the District of Montreal, in the Province of Quebec, Canada, have invented a new and useful medical composition of matter to be used as a remedy for diseases of the eyes; and I do hereby declare the following to be a full, clear, and exact description of the same.

This medical compound is composed of the following ingredients, mixed in the manner and proportions hereinafter stated, viz: Water, one gallon; sugar of lead, four ounces; castor-oil, five ounces.

To prepare this medical compound, it is sufficient to mix all the above-named ingredients and thoroughly mingle by agitation and the compound is ready for use. As the oil, being lighter than the water, lies on top, it is necessary to agitate well each time before using it.

I am aware that sugar of lead and water with other ingredients have already been used in diseases of the eyes; but I am not aware that all of the ingredients of my composition, in the proportions stated, have been used together.

What I claim, and desire to secure by Letters Patent of the United States, is—

The herein-described composition of matter to be used as a medical compound, consisting of water, sugar of lead, and castor-oil, in the above-stated proportions.

Signed at Montreal this 11th day of August, 1884.

MARIE MÉLINA LAMONTAGNE.

In presence of—
    J. BROSSOIT,
    A. BRUNEAU.